United States Patent
Bevan et al.

(10) Patent No.: US 9,449,442 B2
(45) Date of Patent: Sep. 20, 2016

(54) INTERFACE OF AN AUTOMATION SYSTEM (71) Applicant: Vivint, Inc., Provo, UT (US)

(72) Inventors: Scott Bevan, Lehi, UT (US); James Beagley, Taylorsville, UT (US); Jason C. Flint, Provo, UT (US); Jeffrey G. Thomas, Draper, UT (US)

(73) Assignee: Vivint, Inc., Provo, UT (US)

( * ) Notice: Subject to any disclaimer, the term of this patent is extended or adjusted under 35 U.S.C. 154(b) by 44 days.

(21) Appl. No.: 14/522,473

(22) Filed: Oct. 23, 2014

(65) Prior Publication Data

US 2016/0117873 A1    Apr. 28, 2016

(51) Int. Cl.
G11B 9/00     (2006.01)
G07C 9/00     (2006.01)
G06F 3/0484   (2013.01)

(52) U.S. Cl.
CPC ....... G07C 9/00007 (2013.01); G06F 3/04842 (2013.01); G07C 9/00071 (2013.01)

(58) Field of Classification Search
CPC .......... G07C 5/00; G07C 5/008; G07C 9/00; G07C 9/00309; G07C 9/00896; G07C 9/00817; G07C 9/0007; G07C 9/00071
USPC .................................... 340/5.1–5.5
See application file for complete search history.

(56) References Cited

U.S. PATENT DOCUMENTS

| | | | |
|---|---|---|---|
| 6,971,021 B1 * | 11/2005 | Daspit | G06F 21/72 375/220 |
| 7,013,267 B1 * | 3/2006 | Huart | G10L 19/005 704/207 |
| 7,425,946 B1 | 9/2008 | Britton | |
| 7,755,611 B2 | 7/2010 | Barr | |
| 8,572,516 B1 * | 10/2013 | Mitchell | G06F 21/629 715/740 |
| 9,001,046 B2 * | 4/2015 | Kim | G06F 3/0488 345/156 |
| 9,149,013 B2 * | 10/2015 | Andrews | A01G 25/16 |
| 2002/0004858 A1 * | 1/2002 | Carr | H04L 9/0838 710/3 |
| 2002/0188527 A1 * | 12/2002 | Dillard | G06Q 30/0601 705/26.1 |
| 2004/0049743 A1 * | 3/2004 | Bogward | G06F 1/162 715/262 |
| 2005/0055646 A1 * | 3/2005 | Melzer | G06F 9/4443 715/804 |
| 2005/0144594 A1 * | 6/2005 | Yamazaki | H04L 41/0226 717/136 |
| 2006/0016896 A1 * | 1/2006 | Grupp | G04G 21/06 235/492 |
| 2007/0140668 A1 * | 6/2007 | Mizobuchi | G11B 27/105 386/232 |
| 2012/0078386 A1 * | 3/2012 | Holmes | G05B 19/042 700/17 |
| 2012/0079407 A1 * | 3/2012 | Holmes | G05B 23/0216 715/772 |
| 2014/0341447 A1 * | 11/2014 | Cho | G06K 9/00087 382/124 |

OTHER PUBLICATIONS

Divus, Divus Mirror, available from http://www.divus.eu/index.php/en/divus-mirror, accessed on Jul. 31, 2014.

(Continued)

*Primary Examiner* — Allen T Cao (74) *Attorney, Agent, or Firm* — Holland & Hart LLP (57) ABSTRACT

According to at least one embodiment, a computer-implemented method to interface with an automation system is disclosed. One or more activation parameters and deactivation parameters may be identified associated with a mobile control panel. A concealed interface of the mobile control panel may be activated based at least in part on the one or more activation parameters. The activated interface of the mobile control panel may be deactivated based at least in part on one or more sleep parameters.

14 Claims, 5 Drawing Sheets

(56) References Cited

OTHER PUBLICATIONS

Crosby, Touchscreen Market Enters Period of Reflection, available from http://www.zytronic.co.uk/news/white—papers/touch-screen—market—enters—period—ofreflection, accessed on Jul. 31, 2014.

Kaila et al., Living wood: a self-hiding calm user interface, MindTrek '12 Proceeding of the 16th International Academic MindTrek Conference, 2012. (abstract only).

* cited by examiner

INTERFACE OF AN AUTOMATION SYSTEM

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Home automation and security products can be fully automated. Control panels can be used to control an automation system.

SUMMARY

According to at least one embodiment, a computer-implemented method to interface with an automation system is disclosed. One or more activation parameters and deactivation parameters may be identified associated with a mobile control panel. A concealed interface of the mobile control panel may be activated based at least in part on the one or more activation parameters. The activated interface of the mobile control panel may be deactivated based at least in part on one or more sleep parameters.

In some embodiments, the activation parameters may comprise each of one or more proximity triggers, one or more biometric triggers, one or more status triggers, or combinations thereof. The one or more status triggers may comprise each of one or more alarms, unauthorized entries, unauthorized motion detection, entry code access, unauthorized action, or combinations thereof. The biometric parameters may comprise each of one or more of a touch activation, fingerprint activation, voice activation, or combinations thereof. The proximity triggers may comprise detecting a presence of person or a control device within a predetermined proximity of the control panel. In some embodiments, the sleep parameters may comprise each of one or more of a predetermined time period, a response to an off command, an unauthorized intrusion, or combinations thereof.

In some embodiments, the control panel comprises an outward appearance of a common household object. Additionally, the control panel may comprise a touch screen. In some embodiments, a backlight of the mobile control panel may be illuminated based at least in part on the activating.

According to another embodiment, an apparatus to interface with an automation system is also described. The apparatus may include a processor, a memory in electronic communication with the processor and instructions stored on the memory of the processor. The processor may execute the instructions to identify one or more activation parameters and deactivation parameters associated with a mobile control panel and activate a concealed interface of the mobile control panel based at least in part on the one or more activation parameters. The processor may execute the instructions to deactivate the activated interface of the mobile control panel based at least in part on one or more sleep parameters.

According to another embodiment, a non-transitory computer-readable medium that may store instructions executable by a processor is also described. The instructions may identify one or more activation parameters and deactivation parameters associated with a mobile control panel and activate a concealed interface of the mobile control panel based at least in part on the one or more activation parameters. The instructions may deactivate the activated interface of the mobile control panel based at least in part on one or more sleep parameters.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to interfacing with a control panel for an automation system. The control panel may be a mobile in-home unit. The control panel may comprise a non-readily visible interface. The mobility of the control panel may allow alternative placement locations other than a traditional wall-mounted panel.

In some embodiments, the control panel may be hidden. For example, the control panel may be disguised as an object other than a standard control panel. The control panel may be incorporated into an inanimate object on a table top or desk top. For example, the control panel may appear as a router or modem on a desk top or may appear as an innocuous object without any visible buttons or other user inputs. In further embodiments, the control panel may be wall mounted but may appear as a photo or other décor. For example, the control panel may be a touch screen. While in a sleep or inactive mode, the touch screen may present itself as a framed piece of art. However, when the control panel is activated, the control panel may cause the faux art to disappear and replace it with a user interface for an automation and home security system.

Figure 1:
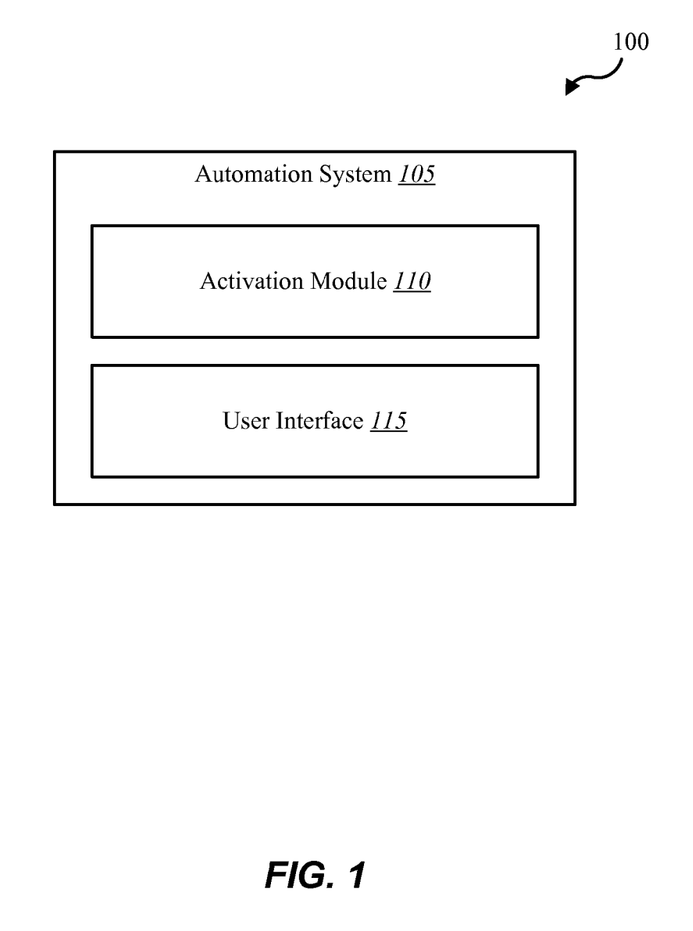
FIG. 1 is a block diagram of an environment in which the present systems and methods may be implemented.

FIG. 1 is a block diagram illustrating one embodiment of an environment 100 in which the present systems and methods may be implemented. In some embodiments, the systems and methods described herein may be performed at least in part on or using an automation system 105. The environment 100 may include the automation system 105, an activation module 110, and a user interface 115.

The activation module 110 may activate the control panel. For example, the control panel may reveal itself based at least in part on one or more activation parameters. The activation parameters may comprise parameters in response to a user activating the system or an unauthorized use of the system. For example, the activation parameters may include one or more proximity triggers, biometric triggers, or status triggers. The proximity triggers may comprise activating the control panel based upon a proximity of either a user or other personnel to the control panel. It may also comprise a proximity of a control device. For example, if a personnel or control device is within a predetermined distance of the control panel such that the control panel is able to sense the actual proximity of the personnel and/or control device, the control panel may activate. The biometric triggers may comprise one or more of a fingerprint, touch activation, voice activation, and the like. For example, if a user touches the control panel, the control panel may be activated based on the touch or may need to reach a fingerprint. Additionally, a user may activate the control panel using a key phrase or the control panel have specific voice recognition software. The status triggers may include unauthorized access, unauthorized use of a portion of the system, response to distributed safety alert, and the like. The unauthorized access may be access by an intruder or may be an accidental entry or use of an authorized user without first disabling an alarm.

The user interface 115 may allow a user and/or administrator to interact with the automation system 105. A user may comprise any person with access to the automation and security system. A user may comprise an administrator, a family member, an employee, and the like. The user may have varying levels of access and control over the automation and security system. The user interface 115 may facilitate communication between the user and the automation system 105. For example, in some embodiments, the automation system 105 may include a security system.

Figure 2:
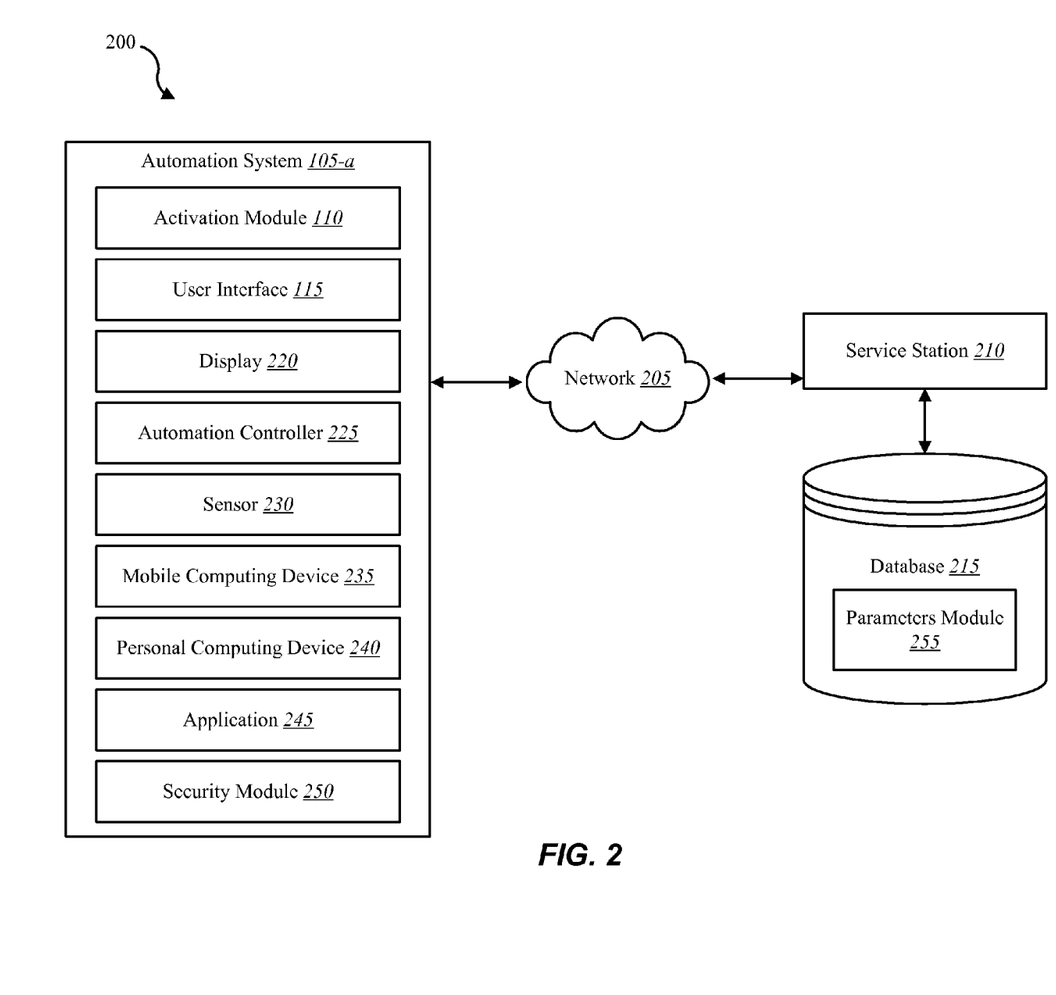
FIG. 2 is a block diagram of another environment in which the present systems and methods may be implemented.

Referring now to FIG. 2, in some embodiments, an environment 200 may include the components of the environment 100 described above, and may further include a network 205, a service station 210, and a database 215. Additionally, the environment 200 may include an automation system 105-a, which may be one example of the automation system 105 described above with reference to FIG. 1. The automation system 105-a may additionally include a display 220, an automation controller 225, a sensor 230, a mobile computing device 235, a personal computing device 240, an application 245, and a security module 250. The automation system 105-a may include various components and functionality that work cooperatively with the activation module 110 and the user interface 115, and/or may operate independently of the activation module 110 and the user interface 115.

The sensor 230 shown in FIG. 2 may represent one or more separate sensors or a combination of two or more sensors in a single sensor device. For example, the sensor 230 may represent one or more camera sensors and one or more motion sensors connected to the environment 200. Additionally, or alternatively, the sensor 230 may represent a combination sensor such as both a camera sensor and a motion sensor integrated in the same sensor device. Although the sensor 230 is depicted as connecting directly to the automation system 105-a, in some embodiments, the sensor 230 may connect to the automation system 105-a over network 205. Additionally, or alternatively, the sensor 230 may be integrated with a home appliance or fixture such as a light bulb fixture. The sensor 230 may include an accelerometer to enable the sensor 230 to detect a movement. The sensor 230 may include a wireless communication device enabling the sensor 230 to send and receive data and/or information to and from one or more devices in the environment 200. Additionally, or alternatively, the sensor 230 may include a GPS sensor to enable tracking a location of the sensor 230. The sensor 230 may include a proximity sensor to enable the sensor 230 to detect a proximity of a person relative to a predetermined distance from a dwelling (e.g., geo-fencing). The sensor 230 may include one or more security detection sensors such as, for example, a glass break sensor, a motion detection sensor, or both. Additionally, or alternatively, the sensor 230 may include a smoke detection sensor, a carbon monoxide sensor, or both. The sensor 230 may include one or more olfactory sensors. In some instances, the sensor 230 may include one or more load sensors which may detect a load or weight applied to the sensor.

In some embodiments, the mobile computing device 235 may include one or more processors, one or more memory devices, and/or a storage device. Examples of the mobile computing device 235 may include mobile phones, smart phones, tablets, personal digital assistants (PDAs), wearable computers, ultra-mobile PCs, etc. Although the mobile computing device 235 is depicted as connecting directly to the automation system 105-a, in some embodiments, the mobile computing device 235 may connect to the automation system 105-a over the network 205. Additionally, the mobile computing device 235 may represent a single mobile computing device or multiple mobile computing devices that may access the automation system 105-a.

In some embodiments, the personal computing device 240 may include one or more processors, one or more memory devices, and/or a storage device. Examples of the personal computing device 240 may include a viewing device associated with a media content set top box, satellite set top box, cable set top box, DVRs, personal video recorders (PVRs), mobile computing devices, computers, servers, etc. Although the personal computing device 240 is depicted as connecting directly to the automation system 105-a, in some embodiments, the personal computing device 240 may connect to the automation system 105-a over the network 205. Additionally, the personal computing device 240 may represent a single mobile computing device or multiple mobile computing devices that may access the automation system 105-a.

In some embodiments, a user may access the functions of automation system 105-a from either the mobile computing device 235 or the personal computing device 240. For example, in some embodiments, the user may have a user profile associated with the automation system 105-a and may access the system via the mobile computing device 235 or the personal computing device 240. In some embodiments, the mobile computing device 235 and/or the personal computing device 240 may include a mobile application interfacing with one or more functions of the automation system 105-a, and the service station 210.

Examples of the automation controller 225 may include a dedicated automation computing device. Examples of a dedicated computing device may include a wall-mounted controller, a remote control, a voice activated controller, a mobile controller, and the like. In some embodiments, the automation controller 225 may control aspects of a property as well as receive and display notifications regarding monitored activity of a property.

In some embodiments, the application 245 may allow a user to control (either directly or via automation controller 225) an aspect of the monitored property based on the user accessibility permissions, including security, energy management, locking or unlocking a door, checking the status of a door, locating a person or item, controlling lighting, thermostat, cameras, receiving notification regarding a current status or anomaly associated with a home, office, place of business, and the like. In some configurations, the application 245 may enable the automation system 105-a to interface with the automation controller 225 and enable the user interface 115 to display automation, security, and/or user management content on the display 220, the mobile computing device 235 and/or the personal computing device 240. Further, the application 245 may be installed on the mobile computing device 235 and/or on the personal computing device 240 to allow a user to interface with the automation system 105-a and the service station 210.

In some embodiments, the automation system 105-a may communicate with the service station 210 via the network 205. Examples of the network 205 include cloud networks, local area networks (LAN), wide area networks (WAN), virtual private networks (VPN), wireless networks (using 802.11, for example), and/or cellular networks (using 3G and/or LTE, for example), etc. The network 205 may be a single network, or may include multiple interconnected, overlapping, or coincidental networks. For example, in some embodiments, the network 205 may include multiple networks interconnected to facilitate communication or may include redundant networks. For example, the network 205 may represent a first network (e.g., the Internet) and a second network (e.g., cellular networks).

The service station 210 shown in FIG. 2 may represent one or more separate service stations or a combination service stations. The service station 210 may be a network operations center, a monitoring center, a service station or any similar station in association with the automation system service provider. In some embodiments, the service station 210 may perform various and/or all aspects of the activation module 110.

In some embodiments, the service station 210 may be coupled to the database 215. The database 215 may include, for example, one or more activation parameters for revealing a hidden control panel. For example, the database 215 may include a parameters module 255 which may store one or more parameters for activating user interface of a control panel. In some embodiments, the parameters module 255 may periodically update with new users or new user profiles. The database 215 may include other information including, for example, historical information about the automation system 105-a, other aspects of environment 200, and the like.

Figure 3:
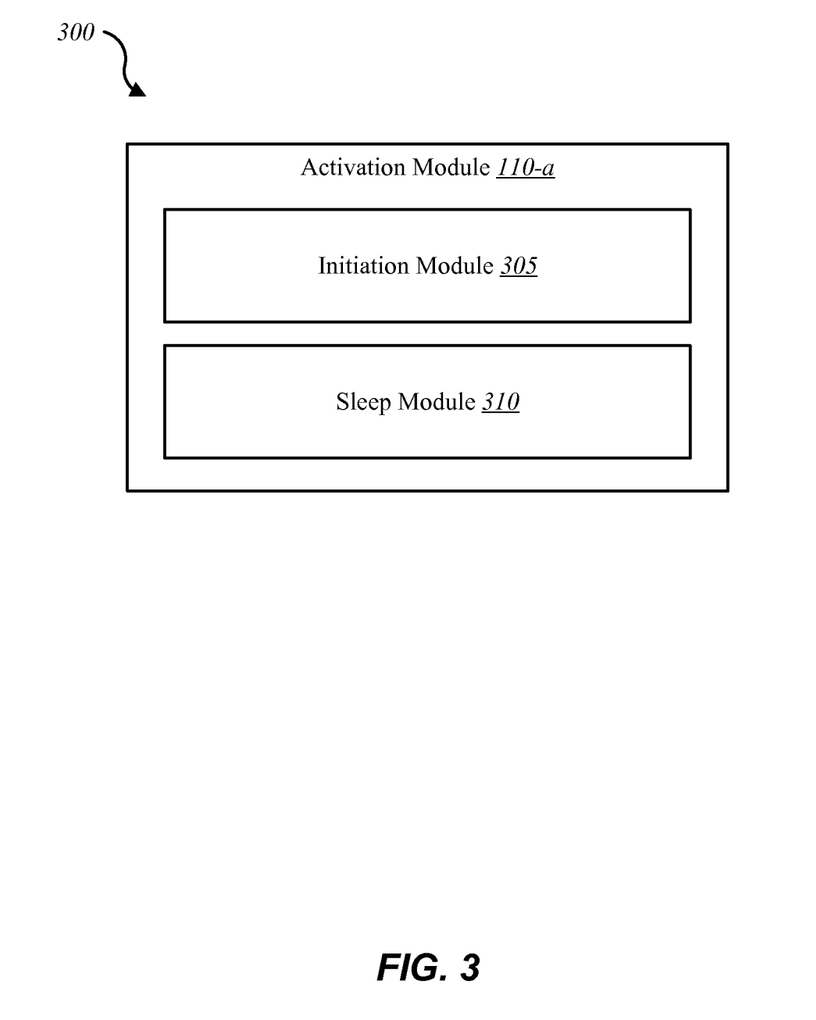
FIG. 3 is a block diagram of an example activation module of the environments shown in FIGS. 1 and 2.

FIG. 3 is a block diagram 300 illustrating one example of an activation module 110-a. The activation module 110-a may be one example of the activation module 110 depicted in FIGS. 1 and/or 2. As depicted, the activation module 110-a may include an initiation module 305, and a sleep module 310. The activation module 110-a may include additional modules and capabilities in other embodiments. Similarly, the activation module 110-a may include fewer number of modules and functionality than that which is described with reference to FIG. 3. The activation module 110-a may optimize the implementation of at least one rule for an automation system.

The initiation module 305 may activate the control panel based at least in part on one or more activation parameters. For example, the initiation module 305 may reveal a concealed user interface of a control panel. The control panel may be concealed in a house hold object or otherwise not have an appearance of a traditional control panel. In some embodiments, the control panel may have a glass surface. The glass surface may be a touch-screen in an inactive mode. The touch-screen may be activated by the initiation module 305. The activation parameters may comprise parameters in response to a user activating the system or an unauthorized use of the system. For example, the activation parameters may include one or more proximity triggers, biometric triggers, status triggers, or some combination thereof.

The proximity triggers may comprise activating the control panel based upon a proximity of either a user or other personnel to the control panel. It may also comprise a proximity of a control device. For example, if a personnel or control device is within a predetermined distance of the control panel such that the control panel senses proximity of personnel and/or control device, the initiation module 305 may activate the control panel. In some embodiments, the initiation module 305 may have a heat-sensing component which may register when a person is within a predetermined distance. The predetermined distance may be small, such that the control panel is not erroneously activated. For example, the predetermined distance may be within approximately three feet of the control panel. In other embodiments, the predetermined distance may be greater than or less than approximately three feet.

In other embodiments, the initiation module 305 may activate the user interface of the control panel based at least in part on a proximity of a control device. The control device may comprise a remote control, a key fob sensor, a personal computing device, a mobile device, or the like. The initiation module 305 and the control device may be synchronized to ensure proximity of the device will activate the control panel. The initiation module 305 may use wireless technology, such as Blue Tooth technology, to detect the presence of the control device. In other embodiments, the control device and the control panel may connect via a hard connection or a wired connection. For example, the control device and control panel may connect via one or more wires, a docking station, or the like.

The biometric triggers may comprise one or more of a fingerprint, touch activation, voice activation, and the like. For example, if a user touches the control panel, the initiation module 305 may activate the control panel based on the touch or may read a fingerprint. The touch parameters may require a particular part of the control panel to touch for activation. In some instances, the touch may require a single touch or a pattern. The pattern may be a series of double tapping, or touching the control panel and dragging the finger in a deliberate pattern. In some embodiments, the touch parameter may be universal to all users of an automation system. In other embodiments, the touch parameter may be unique to a particular user or profile. In Some embodiments, the initiation module 305 may use voice recognition to activate the control panel based on a phrase or a specific voice. A user may activate the control panel using a key phrase or the control panel have specific voice recognition software. The phrase may be a generic phrase to all users of an automation system, or may be specific to select users.

The status triggers may include unauthorized access, unauthorized use of a portion of the system, response to distributed safety alert, and the like. The unauthorized access may be an intruder entry or an accidental entry or use of an authorized user without first disabling an alarm. For example, an intruder may enter a location with an automation system. The entry by the intruder may cause the automation system to set off an alarm. The initiation module 305 may also activate the user interface based on the entry. In some embodiments, the initiation module 305 may first determine a proximity of a user to the location prior to activating an alarm. For example, a user may carry a remote device associated with the automation system. The initiation module 305 may determine a location of the device to determine if the alarm associated with the automation system was mistakenly set off by a user or if an unauthorized entry occurred.

In some embodiments, a combination of parameters may be required to activate the control panel. For example, the initiation module 305 may activate the user interface when a person approaches the control panel but may require additional input prior to unlocking or allowing a person to interface and/or access the automation system. In further embodiments, an administrator of the automation system may determine which activation parameters turn on the user interface. The administrator may wish for a particular or combination of parameters or may personalize the parameters based upon one or more user profiles.

Activating the panel may comprise one or more methods of revealing the user interface of the control panel to a user. For example, in some embodiments, upon activation, the initiation module 305 may turn on the control panel. For example, if the control panel comprises a touch screen, the initiation module 305 may activate the touch screen. Once the touch screen is activated, further verifications may be required to interact with the control panel. For example, a user may be requested to enter in a unique identifier to access the system. In further embodiments, the initiation module 305 may activate a back light which may cause the control panel to appear. In instances where the control panel appears as a piece of art, activating the control panel may change the appearance of the artwork to a user interface for a control panel.

The sleep module 310 may cause the control panel or the user interface to enter into a rest mode or a hidden mode. For example, the sleep module 310 may be programmed to turn off the user interface based at least in part on one or more sleep parameters. The sleep parameters may comprise a predetermined time limit, a deactivation key code, or the like. The time limit may be a default limit set by the automation system or may be predetermined time period set by the administrator. The time limit may be approximately five minutes, or may be shorter or longer. In some embodiments, the time limit may have a maximum value. For example, the sleep module 310 may turn off the user interface after approximately one hour has surpassed. In some embodiments, the sleep module 310 may respond to a deactivation code. The deactivation code may comprise a button on the control panel, a series of finger taps, or other pressure points and the like.

Figure 4:
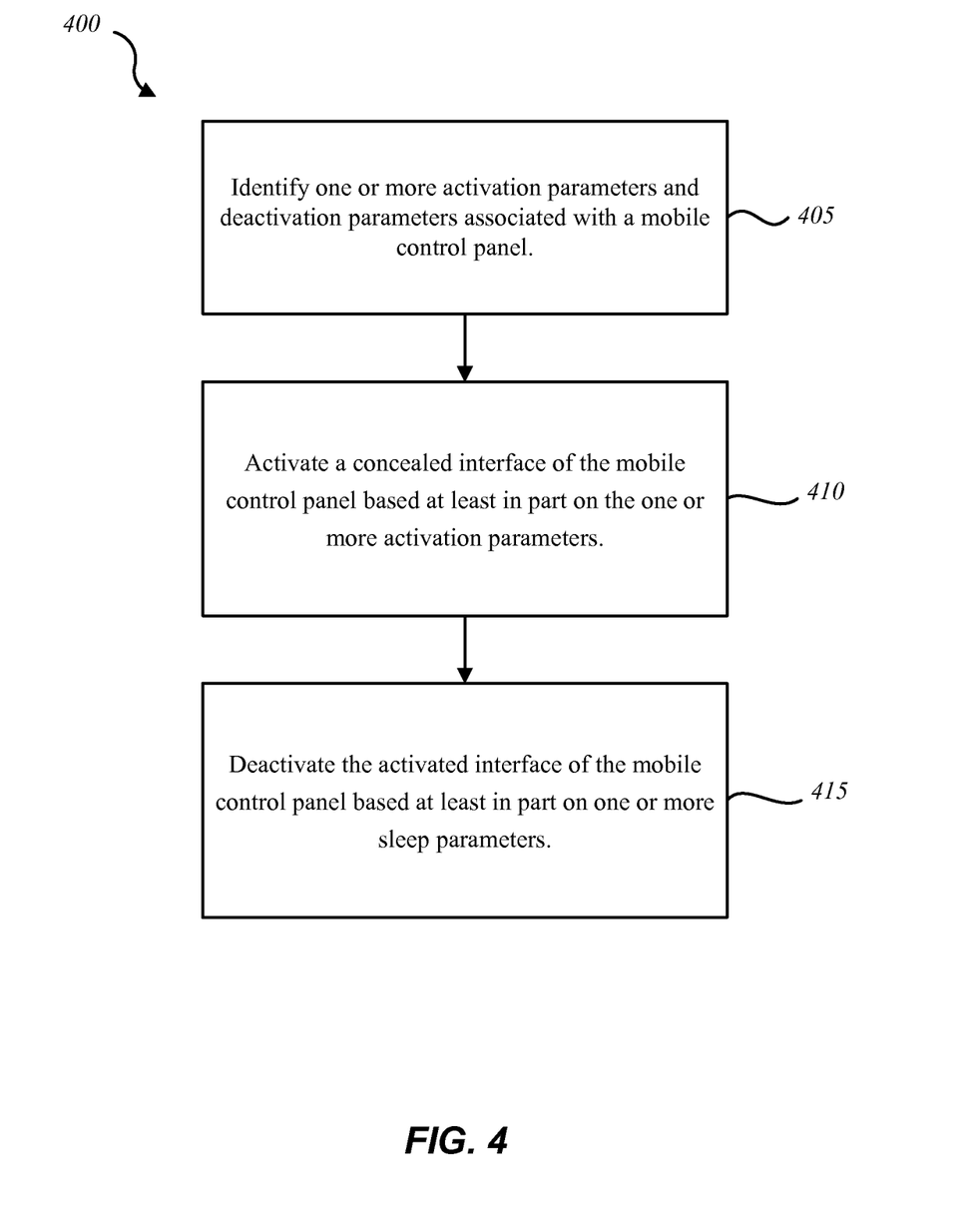
FIG. 4 is a flow diagram illustrating an exemplary method for concealing an automation panel.

FIG. 4 is a flow diagram illustrating one embodiment of a method 400 for interfacing with an automation rule. In some configurations, the method 400 may be implemented in whole or in part by the activation module 110 of the automation system 105 shown in FIGS. 1 and/or 2. In further embodiments, the method 400 may be performed generally by the automation system 105 shown in FIGS. 1 and/or 2, or even more generally by the environments 100, 200 shown in FIGS. 1 and/or 2.

At block 405, one or more activation parameters and deactivation parameters may be identified that are associated with a mobile control panel. The mobile control panel may comprise a hidden user interface. For example, the control panel may appear as a nominal household object, such as an electronic device an innocuous household knickknack, a piece of art, and the like. In some embodiments, the control panel may be a touch screen device. The touch screen device may appear as a simple glass surface which may reveal a user interface based on one or more activation parameters. For example, the activation parameters may include one or more proximity triggers, biometric triggers, or status triggers, or combination thereof as discussed previously.

At block 410, a concealed interface of a mobile control panel may be activated based at least in part on the one or more activation parameters. For example, the control may comprise a touch screen. The touch screen may comprise a touch sensitive liquid crystal display, or LCD, screen. Upon activating the concealed interface, a backlight may illuminate and reveal the control panel to a user. The lighting may comprise light emitting diode, or LED, or other light emitting apparatus.

At block 415, the activated interface of the mobile control panel may be deactivated based at least in part on one or more sleep parameters. The sleep parameters may comprise one or more of a predetermined time period, a purposeful off switch, a response to an unauthorized intrusion, or the like. The predetermined time period may comprise a set time period after the control panel was last used. For example, approximately five minutes after the control panel was last touched, the concealed interface may be turned off or set to a sleep mode. The concealed interface may also deactivate based on an off switch. The off switch may be a physical button to depress or activate. The off switch may also be an option on the user interface. In additional embodiments, the off switch may be a series of touches or swipes that may cause the interface to conceal itself.

In some embodiments, the concealed interface may also deactivate if an intruder has entered the home. For example, the control panel may appear as a nominal household object. If an intruder enters a home, it may take a few moments for the intruder to locate the control panel if the user interface has been activated. However, a typical user of an automation system may know the location of the control panel and access the control within a short time frame, such as 30 seconds, one minute, or the like. If a brief time period has passed after an alarm associated with automation system has been triggered, the control panel may deactivate and conceal the user interface. Concealing the user interface and disguising the control panel as a nominal household object may prevent smash and crash intrusions and allow the control panel to continue to communicate with an automation system provider.

Figure 5:
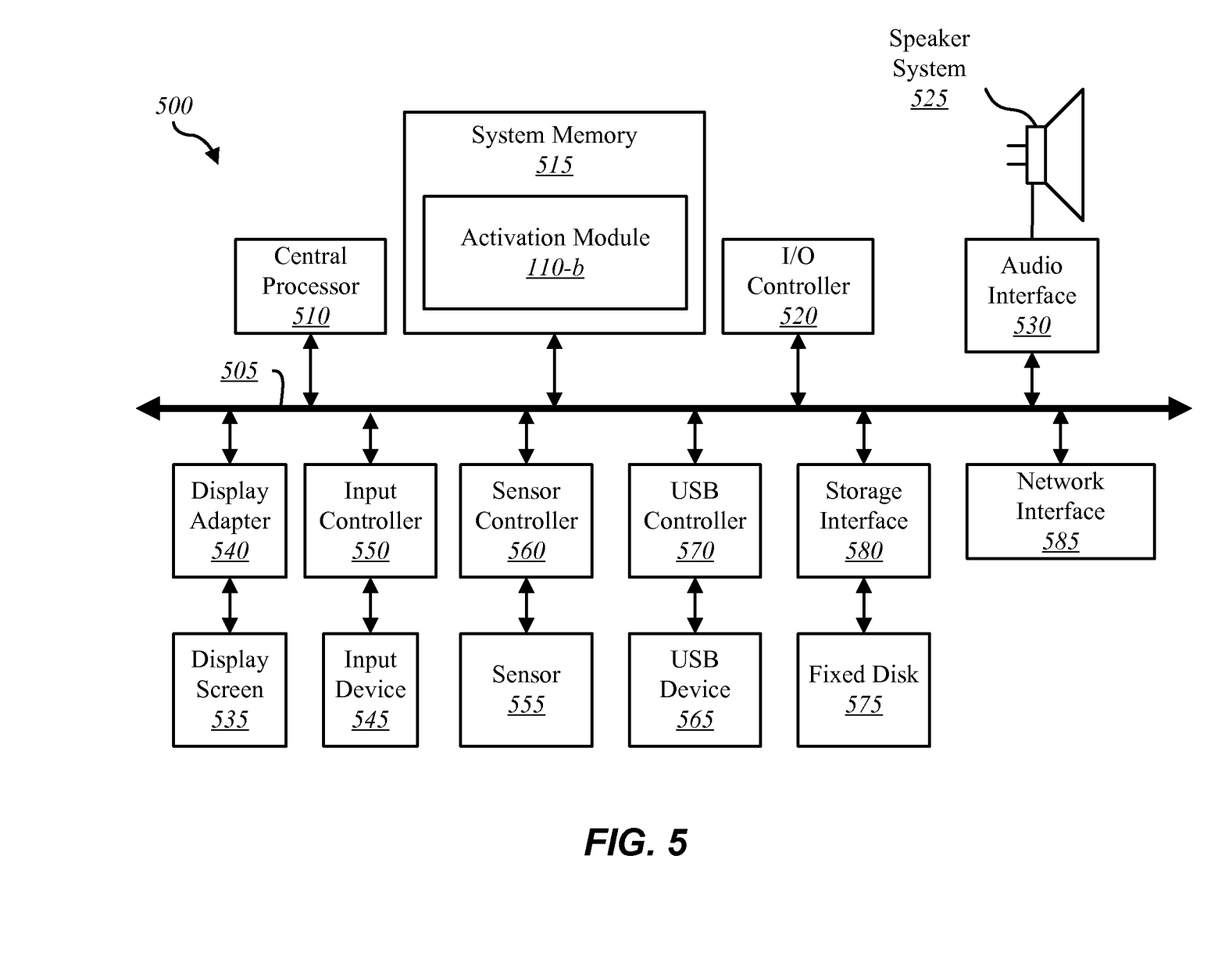
FIG. 5 is a block diagram of a computer system suitable for implementing the present systems and methods of FIGS. 1-4.

FIG. 5 depicts a block diagram of a controller 500 suitable for implementing the present systems and methods. The controller 500 may be an example of the automation controller 225, the personal computing device 240, and/or the mobile computing device 235 illustrated in FIG. 2. In one configuration, the controller 500 may include a bus 505 which interconnects major subsystems of controller 500, such as a central processor 510, a system memory 515 (typically RAM, but which may also include ROM, flash RAM, or the like), an input/output controller 520, an external audio device, such as a speaker system 525 via an audio output interface 530, an external device, such as a display screen 535 via display adapter 540, an input device 545 (e.g., remote control device interfaced with an input controller 550), multiple USB devices 565 (interfaced with a USB controller 570), and a storage interface 580. Also included are at least one sensor 555 connected to bus 505 through a sensor controller 560 and a network interface 585 (coupled directly to bus 505).

Bus 505 allows data communication between central processor 510 and system memory 515, which may include read-only memory (ROM) or flash memory (neither shown), and random access memory (RAM) (not shown), as previously noted. The RAM is generally the main memory into which the operating system and application programs are loaded. The ROM or flash memory can include, among other code, the Basic Input-Output system (BIOS) which controls basic hardware operation such as the interaction with peripheral components or devices. For example, an activation module 110-b to implement the present systems and methods may be stored within the system memory 515. The activation module 110-b may be an example of the activation module 110 illustrated in FIGS. 1, 2, and/or 3. Applications (e.g., application 245) resident with controller 500 are generally stored on and accessed via a non-transitory computer readable medium, such as a hard disk drive (e.g., fixed disk drive 575) or other storage medium. Additionally, applications can be in the form of electronic signals modulated in accordance with the application and data communication technology when accessed via the network interface 585.

Storage interface 580, as with the other storage interfaces of controller 500, can connect to a standard computer readable medium for storage and/or retrieval of information, such as a fixed disk drive 575. The fixed disk drive 575 may be a part of controller 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 500 wirelessly via network interface 585.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 5 need not be present to practice the present systems and methods. The devices and subsystems can be interconnected in different ways from that shown in FIG. 5. The aspect of some operations of a system such as that shown in FIG. 5 are readily known in the art and are not discussed in detail in this application. Code to implement the present disclosure can be stored in a non-transitory computer-readable medium such as one or more of system memory 515 or fixed disk 575. The operating system provided on controller 500 may be iOS®, ANDROID®, MS-DOS®, MS-WINDOWS®, OS/2®, UNIX®, LINUX® or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

The invention claimed is:

1. A computer-implemented method of interfacing with an automation system, comprising:
   identifying one or more activation parameters and deactivation parameters associated with a mobile control panel, wherein each of the one or more activation parameters comprise one or more proximity triggers, one or more biometric triggers, one or more status triggers, or combinations thereof;
   wherein each of the one or more proximity triggers comprises detecting a presence of person or a control device within a predetermined proximity of the control panel;
   activating a concealed interface of the mobile control panel based at least in part on the one or more activation parameters; and
   deactivating the activated interface of the mobile control panel based at least in part on the one or more deactivation parameters.

2. The computer-implemented method of claim 1, wherein each of the one or more status triggers comprises one or more alarms, unauthorized entries, unauthorized motion detection, entry code access, unauthorized action, or combinations thereof.

3. The computer-implemented method of claim 1, wherein each of the one or more biometric triggers comprises one or more of a touch activation, fingerprint activation, voice activation, or combinations thereof.

4. The computer-implemented method of claim 1, wherein the control panel comprises an outward appearance of a common household object.

5. The computer-implemented method of claim 1, wherein the control panel comprises a touch screen.

6. The computer-implemented method of claim 5, further comprising:
   illuminating a backlight of the mobile control panel based at least in part on the activating.

7. The computer implemented method of claim 1, wherein the deactivation parameters comprises one or more of a predetermined time period, a response to an off command, an unauthorized intrusion, or combinations thereof.

8. An apparatus to interface with an automation system, comprising:
   a processor;
   a memory in electronic communication with the processor; and
   instructions stored in the memory, the instructions being executable by the processor to:
   identify one or more activation parameters and deactivation parameters associated with a mobile control panel, wherein each of the one or more activation parameters comprise one or more proximity triggers, one or more biometric triggers, one or more status triggers, or combinations thereof;
   wherein each of the one or more proximity triggers comprises instructions to detect a presence of person or a control device within a predetermined proximity of the control panel;
   activate a concealed interface of the mobile control panel based at least in part on the one or more activation parameters; and
   deactivate the activated interface of the mobile control panel based at least in part on the one or more deactivation parameters.

9. The apparatus of claim 8, wherein each of the one or more status triggers comprises one or more alarms, unauthorized entries, unauthorized motion detection, entry code access, unauthorized action, or combinations thereof.

10. The apparatus of claim 8, wherein each of the one or more biometric triggers comprises one or more of a touch activation, fingerprint activation, voice activation, or combinations thereof.

11. A non-transitory computer-readable medium storing instructions executable by a processor to:
   identify one or more activation parameters and deactivation parameters associated with a mobile control panel, wherein each of the one or more activation parameters comprise one or more proximity triggers, one or more biometric triggers, one or more status triggers, or combinations thereof;
   wherein each of the one or more proximity triggers comprises instructions to detect a presence of person or a control device within a predetermined proximity of the control panel;
   activate a concealed interface of the mobile control panel based at least in part on the one or more activation parameters; and
   deactivate the activated interface of the mobile control panel based at least in part on the one or more deactivation parameters.

12. The computer-readable medium of claim 11, wherein each of the one or more status triggers comprises one or more alarms, unauthorized entries, unauthorized motion detection, entry code access, unauthorized action, or combinations thereof.

13. The computer-readable medium of claim 11, wherein each of the one or more biometric triggers comprises one or more of a touch activation, fingerprint activation, voice activation, or combinations thereof.

14. The computer-readable medium of claim 11, wherein the control panel comprises an outward appearance of a common household object.

\* \* \* \* \*